United States Patent [19]
Matsui

[11] Patent Number: 5,886,978
[45] Date of Patent: Mar. 23, 1999

[54] OPTICAL HEAD APPARATUS

[75] Inventor: Tsutomu Matsui, Tokyo, Japan

[73] Assignee: NEC Corporation, Japan

[21] Appl. No.: 721,005

[22] Filed: Sep. 26, 1996

[30] Foreign Application Priority Data

Sep. 26, 1995 [JP] Japan ................................. 7-247107

[51] Int. Cl.⁶ .......................... G11B 21/24; G11B 7/00
[52] U.S. Cl. ...................... 369/244; 369/44.15; 359/813
[58] Field of Search .................................. 369/244, 247, 369/44.15, 44.16; 359/813, 814

[56] References Cited

U.S. PATENT DOCUMENTS

| | | | |
|---|---|---|---|
| 5,050,964 | 9/1991 | Mori | 369/44.16 |
| 5,184,002 | 2/1993 | Chu | 369/44.15 |
| 5,187,702 | 2/1993 | Takahashi | 369/44.15 |
| 5,220,459 | 6/1993 | Ichikawa et al. | 369/44.15 |

FOREIGN PATENT DOCUMENTS

| | | |
|---|---|---|
| 62-65234 | 3/1987 | Japan . |
| 4-324127 | 11/1992 | Japan . |
| 5-68013 | 9/1993 | Japan . |

*Primary Examiner*—George J. Letscher
*Attorney, Agent, or Firm*—Ostrolenk, Faber, Gerb & Soffen, LLP

[57] ABSTRACT

An optical head apparatus is realized in which an objective lens actuator and the whole optical system are reduced in height, and which can be used in common between a system in which the light beam comes incident in the direction of the radius of the information disk and another in which the light beam is arranged in a direction tangent to the information disk. A lens holder having a substantially hexagonally shaped plane is supported by two wire springs, each shaped in a triangle with two of its aides extended and fitted to an actuator base, to be able to freely move up and down and to freely rotate. On two side walls of a lens holder are arranged tracking coils and focusing coils, and magnets are arranged in opposite positions of the actuator base. Underneath an objective lens is arranged an opening wide in the horizontal direction, and the dimension of the apparatus in the vertical direction (the direction normal to the surface of the diagram) can be reduced by arranging a 45-degree mirror in this space not in contact with the lens holder.

14 Claims, 6 Drawing Sheets

OPTICAL HEAD APPARATUS

BACKGROUND OF THE INVENTION

1. Field of the Invention

The present invention relates to an optical head apparatus for recording information into, and reproducing or erasing information recorded in, a recording medium such as an optical disk, and more particularly to an optical apparatus having a unique objective lens actuator.

2. Description of the Prior Art

Along with the vastly spreading use of computers, optical disks are attracting note as a recording medium permitting high speed access and, moreover, far surpassing magnetic disks in storage capacity. Optical disks have not only such remarkable features as a high transfer rate, fast random access and large capacity but also an advantage of high durability because of their non-contact operation. An optical head apparatus, intended to irradiate a light beam to an information recording disk, converges the light beam into a fine spot on a recording track formed on the information recording face to record, reproduce or erase information. Information is reproduced by the variation of the reflected light from the disk due to the incident light beam to the disk.

The information disk is somewhat warped and, when turning, is wobbled by eccentricity. In spite of these warp and wobbling of the disk, the light beam has to be focused and tracked on the recording track accurately. Therefore, the objective lens to focus the light beam can be finely moved in the direction of the focusing axis (focusing servo) and, at the same time, in the direction orthogonal to the recording track (tracking servo). Techniques for such servo driving of the objective lens are disclosed in, for example, the Japanese Patent Publication No. Hei 5(1993)-68013 and the Japanese Patent Laid-open Nos. Sho 62(1987)-65234 and Hei 4(1992)-324127.

FIG. 8 illustrates an objective lens actuator according to the prior art, which servo-drives the objective lens as an essential part of an optical head apparatus. This objective lens actuator 10 has a rectangularly shaped objective lens holder 11, the lower end of the objective lens 12 is fitted into a hole (not shown) bored at the center of this holder 11. The focusing axis of this objective lens 12 is represented by a single-point chain line 13. Around the circumference of the objective lens holder 11 is wound a focusing coil 14 so that the center axis of the coil be parallel to the focusing axis 13. To the front side, in the diagram, and the opposite side of this focusing coil 14 are stuck pairs of substantially rectangularly shaped tracking coils 15.

To the two other sides of the focusing coil 14, to which no tracking coils 15 are stuck, are fixed U-shaped holders 17, and the other ends of a total of four elastic supporters (wires) 18 fitted to these holders are fixed to a pair of blocks 21 on a printed circuit board 19. Therefore, the objective lens holder 11 to which the objective lens 12 is fitted by these four elastic supporters 18 can freely move in both the direction F of the focusing axis 13 (focusing direction) and the direction T orthogonal to it (tracking direction).

The objective lens holder 11 is arranged at a prescribed distance from an actuator base 25 so that a pair of yokes 26 arranged on the flat actuator base 25 loosely fit a pair of holes 23 bored in the direction of the focusing axis 13. A magnet 28 on the actuator base 25 is positioned opposite to the tracking coils 15. As a result, parallel magnetic fluxes are generated, to cross the focusing coil 14 and the tracking coils 15 at a right angle, in a magnetic gap 29 of a magnetic circuit of a substantially closed magnetic configuration, consisting of these yokes 26 and magnet 28. Driving these coils 14 and 15 with currents enables the objective lens 12 to be driven in the focusing direction F and the tracking direction T.

FIG. 9 schematically illustrates an optical head using the objective lens actuator shown in FIG. 8. An optical head 30 consists of an optical system container 34 which, for example, leads upward a laser beam 32 emitted from a laser pen 31 with a 45-degree mirror 33, and the objective lens actuator 10, arranged over the container 34, in which the objective lens 12 is arranged in the upper part to be freely movable to converge the laser beam on a prescribed track of an information disk 35, which typically may be an optical disk.

Consequently, the optical head 30 according to the prior art inevitably tends to have a considerably great overall height H, which consists of the height $h_1$ of the objective lens actuator 10 and the height of the optical system container 34, resulting in the problem of making it difficult for any information apparatus using an optical head 30 to have a reasonable low profile.

SUMMARY OF THE INVENTION

An object of the present invention, therefore, is to provide an optical head whose combined height of the objective lens actuator and the optical system is substantially reduced.

Another object of the invention is to provide an optical head apparatus whose combined height of the objective lens actuator and the optical system is substantially reduced and, moreover, which can be shared for use between an arrangement in which the light beam comes incident in the radial direction of the information disk and another in which the light beam comes incident in the tangential direction of the information disk.

According to a first aspect of the invention, there is provided an optical head apparatus provided with (a) a lens holder having a top plate arranged horizontally, two mutually parallel side walls whose upper ends are positioned at the two mutually opposite ends of the top plate, and tracking coils and focusing coils arranged on these side walls; (b) a plurality of wire springs each of which consists of a linear member both ends of whose central part of a prescribed length are bent to make the non-central parts cross each other to let the whole member form a triangle with two of its sides extended, whose centrally positioned parts of the prescribed length are fixed substantially horizontally to prescribed positions of the lens holder at different heights, and the two ends of each of which are fixed to corresponding positions elsewhere than the lens holder so as to enable this lens holder to freely rotate in the horizontal direction and to freely move vertically; (c) an objective lens arranged in a position away from the rotational center of the lens holder on the top plate, the vertical direction of the objective lens being coincident with that of the optical axis; (d) magnets which are fixed in positions opposite to the two side walls of the lens holder, on which the tracking coils and the focusing coils are arranged, not in contact with these coils, and are caused to generate magnetic fields, which provide rotational or vertical forces to the lens holder, by the moving forces generated by these coils; and (e) deflecting means which, fixed in the space underneath the position of the objective lens on the top plate not in contact with the lens holder, deflects the light beam having proceeded in parallel to the top plate so as to lead it to the objective lens.

Thus, according to the first aspect of the invention, the lens holder wherein the objective lens is arranged on the top plate is supported by a plurality of wire springs, each of which is shaped in a triangle two of whose sides are extended, to be freely movable in the direction of the focusing axis of the objective lens and freely rotatable in the horizontal direction. For this purpose, tracking coils and focusing coils are arranged on two mutually parallel side walls of the lens holder, and magnets are arranged in positions opposite to them not in contact with them. When the focusing coils are excited, a force in the direction of the optical axis is applied and, when the tracking coils are driven, a force in the rotational direction is applied so that a track of an information disk positioned on the focal plane above the objective lens can be traced. Underneath the part of the top plate where the objective lens is arranged the beam deflecting means, such as a mirror or a prism, not in contact with the lens holder so as to reflect the light beam to lead it to the objective lens. This space, in which the beam deflecting means can be arranged, provided underneath the top plate of the lens holder eliminates the need to place one box over another as according to the prior art, and enables the overall size of the apparatus to be reduced.

According to a second aspect of the invention, the number of wire springs in two. Whereas three or more wire springs may be arranged in parallel to each other to support the lens holder, where the lens holder is supported by two wire springs, they can also be used for transmitting a drive signal to drive either the tracking coils or the focusing coils. The crossing parts of the wire springs should desirably be not in contact each other in order to avoid their unnecessary deformation when the lens holder rotates or moves up and down. The deformation of the wire springs at the time of their fitting can be prevented by cream-soldering their ends to a printed circuit board fixed elsewhere than to the lens holder.

According to a third aspect of the invention, the plane of the lens holder is hexagonal. Where the lens holder has such a shape, the tracking coils and the focusing coils can be stuck to two side walls corresponding to a specific pair of parallel sides.

According to a fourth aspect of the invention, the means to deflect the light beam in 90-degree is a 45-degree mirror.

According to a fifth aspect of the invention, underneath the top plate of the lens holder is arranged an opening whose shape is such that a light beam can still come incident even if the deflecting means changes its position by 90 degrees in the horizontal direction. The arrangement of the deflecting means turned by 90-degrees enables a light beam whose direction of incidence differs by 90 degrees to be led to the objective lens, and thereby makes it possible for the optical head apparatus to be used in common between different types of optical system such as an integrated type and a separate type.

According to a sixth aspect of the invention, the wire springs, each shaped in a triangle with two of its sides extended, are built of a phosphor bronze spring material.

According to a seventh aspect of the invention, the wire springs are built of a stainless steel spring material, and the soldered parts are plated with a material well wettable with solder, such as copper, silver or gold.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENT

A preferred embodiment of the present invention will be described in detail below.

Figure 1:
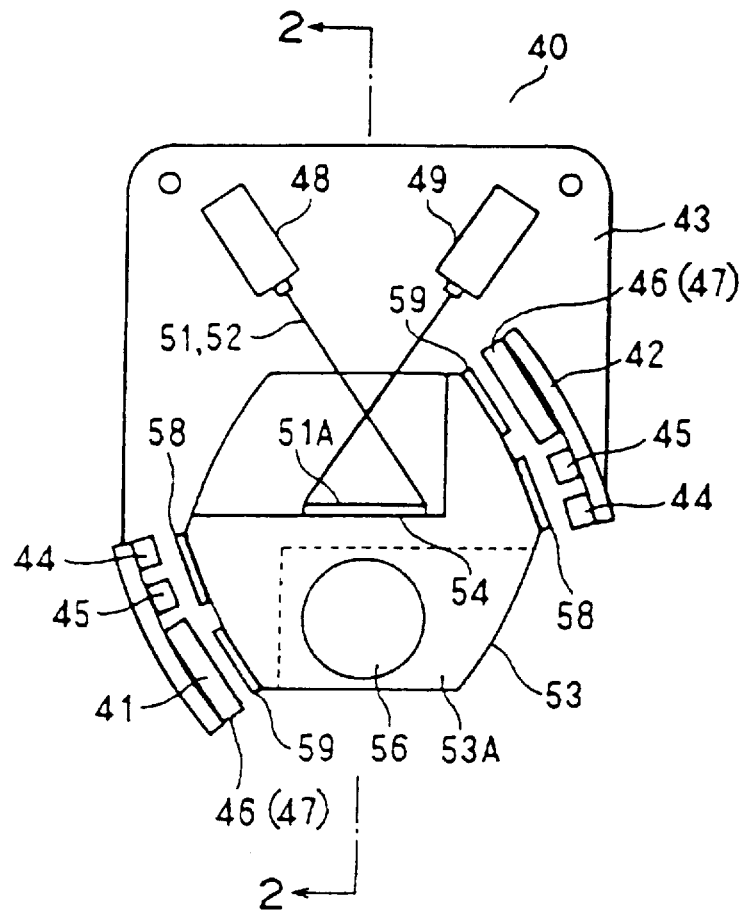
FIG. 1 is a plan of an objective lens actuator for an optical head apparatus, which is a preferred embodiment of the invention.

FIG. 1 illustrates the objective lens actuator part of an optical head apparatus, which is the preferred embodiment of the invention. This objective lens actuator 40 is provided with an actuator base 43 having wall-shaped magnet stands 41 and 42, formed by pressing metal plates and arranged opposite to each other. To the magnet stands 41 and 42 are fitted column-shaped first and second magnets 44 and 45 whose lengthwise direction is the direction normal to the surface of this diagram and third and fourth magnets 46 and 47 (the fourth magnet 47 which is positioned lower is not shown) whose lengthwise direction is in parallel to the surface of this diagram and which are arranged in two tiers, one over the other.

Near the end of the actuator base 43 opposite to the part where these magnet stands 41 and 42, there are fixed printed circuit boards 48 and 49. To these printed circuit boards 48 and 49 are fixed ends of a pair of wire springs 51 and 52, whose end parts cross each other to form a triangle with two sides extended. These wire springs 51 and 52 are arranged at a prescribed distance from each other in a direction normal to the surface of this diagram.

The central portion 51A, corresponding to the base of the triangle of the first wire spring 51 arranged above the other is soldered to an upper part of the printed circuit board 54, which is fixed to the stepped portion of the central part of a substantially hexagonal lens holder 53. The other second wire spring 52, which overlaps the first wire spring 51 in this FIG. 1, is similarly soldered to a lower part of the printed circuit board 54. In this way, the lens holder 53 is enabled by the pair of wire springs 51 and 52 to move freely in the vertical direction and to rotate freely in the horizontal direction.

A round hole (not shown) is bored in a substantially L-shaped upper end face 53A of the lens holder 53, the part which is above the printed circuit board 54, and an objective lens 56 is fitted there. On the sides of the lens holder 53, in positions respectively opposite to the magnet stands 41 and 42, are arranged rectangularly shaped tracking coils 58 and focusing coils 59 for electromagnetic drive.

Figure 2:
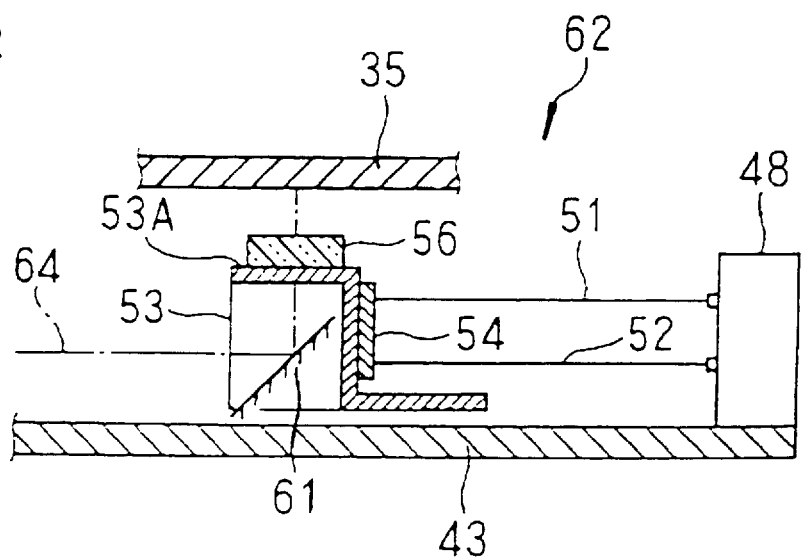
FIG. 2 shows a cross section of essential parts of an optical head equipped with the objective lens actuator.
Figure 9:
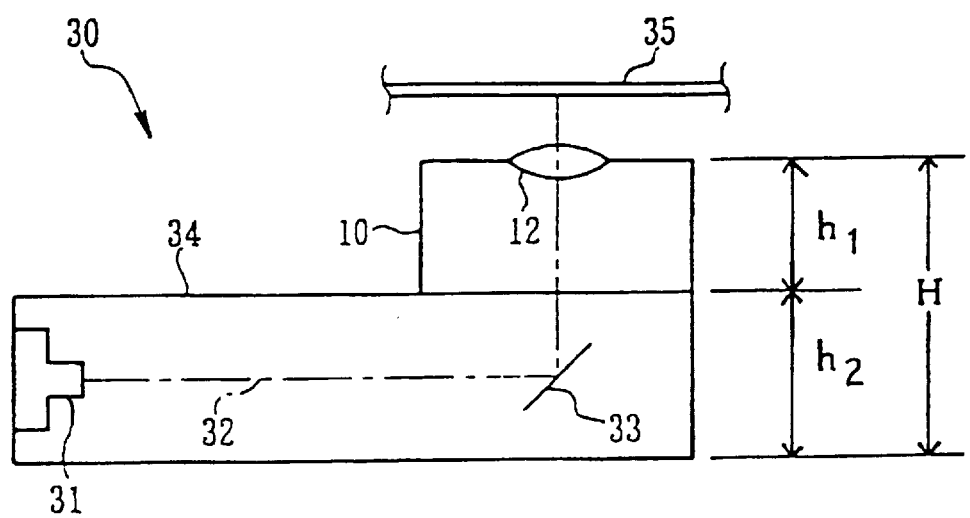
FIG. 9 shows a schematic profile of an optical head using the objective lens actuator illustrated in FIG. 8.

FIG. 2 illustrates essential parts of an optical head equipped with this objective lens actuator. The drawing shows the objective lens actuator of FIG. 1 in the A—A direction. The lens holder 53 is held floating over the actuator base 43 by the two wire springs 51 and 52 fitted to the printed circuit board 48. Underneath the upper end face 53A of the lens holder 53 where the objective lens 56 is fitted there is a vacant space, in which a 45-degree mirror 61 is fixed, behind the printed circuit board 54, over the actuator base 43. Therefore, when a laser beam 54 parallel to the bottom face of the actuator base, emitted from an unshown laser pen (see FIG. 9) of this optical head 62 comes incident on the 45-degree mirror 61, it is deflected by 90 degrees to come incident on the objective lens 56, and converges on a prescribed track of an information disk 35, which may typically be an optical disk, to write in, read out or delete information.

Figure 3:
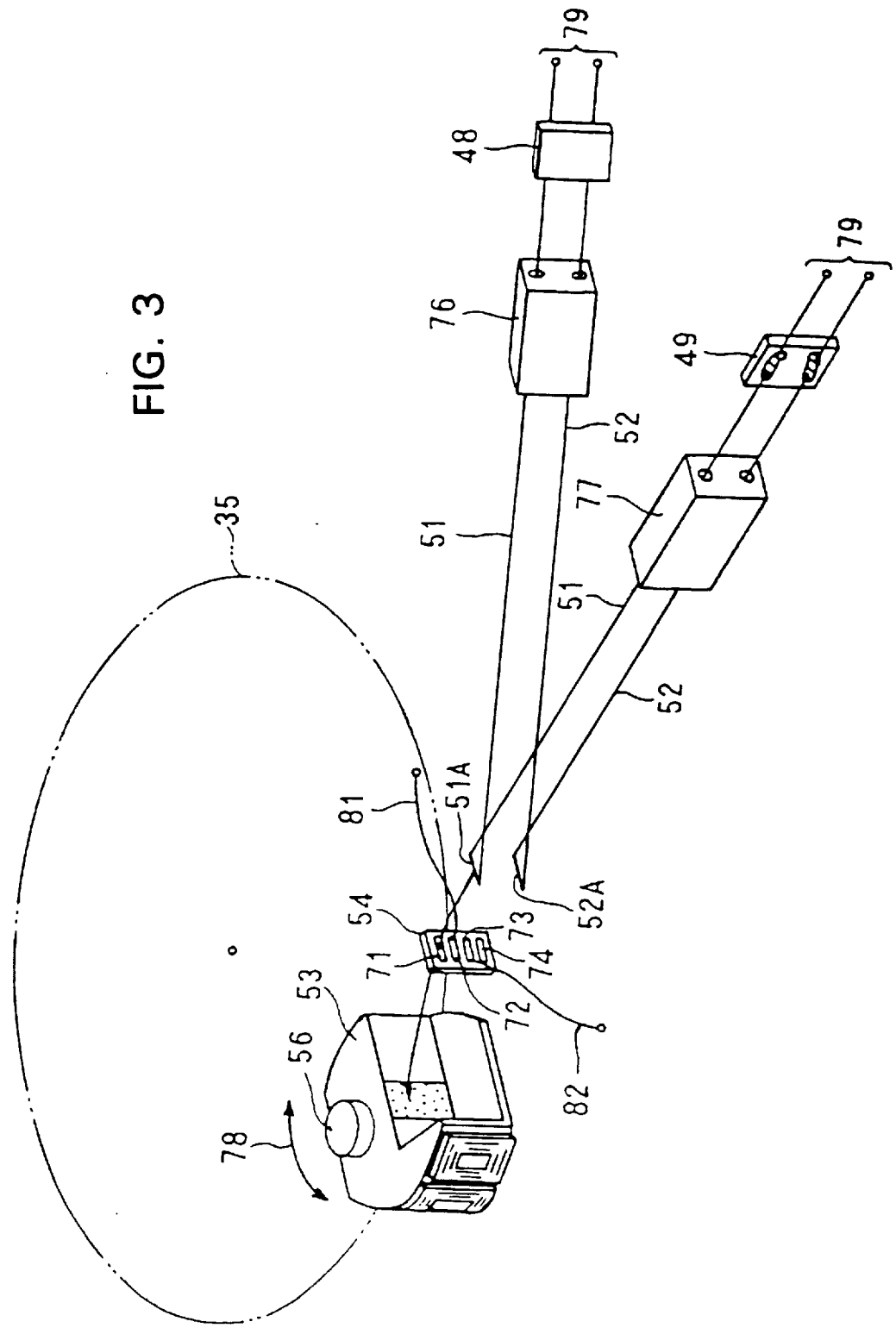
FIG. 3 shows a perspective view of the manner in which the lens holder is supported by wire springs.

FIG. 3 illustrates how the wire springs support the lens holder. The printed circuit board 54 can be fixed to the stepped portion of the lens holder 53 to which the objective lens 56 is fitted. On the printed circuit board 54 are arranged four soldering positions 71 through 74, and to the first soldering position 71 is soldered the central portion 51A of the first wire spring 51. Similarly, the central portion 52A of the second wire spring 52 is soldered to the fourth soldering position 74. Each of the two portions, upper and lower, of the wire springs 51 and 52 in one direction is threaded through one or the other of two holes bored in parallel into a first damping box 75 at a prescribed distance from each other, and is cream-soldered to a printed circuit board 48 shown in FIGS. 1 and 2. Similarly, each of the other two portions, upper and lower, of the wire springs 51 and 52 in the other direction is threaded through one or the other of two holes bored in parallel in a second damping box 77, and is cream-soldered to another printed circuit board 49 shown in FIGS. 1 and 2.

The first and second damping boxes 76 and 77 are shown neither in FIG. 1 nor in FIG. 2 for the sake of simplification. The gaps between the holes in these damping boxes 76 and 77 and the wire springs 51 and 52 running through them are filled with silicon gel to damp the resonance peaks of the primary resonant frequency. The two wire springs 51 and 52, besides supporting the lens holder 53, transmit focusing coil drive signals 79 to control the electro-magnetical actuation of the focusing coils 59, and are connected to the printed circuits 48, 49 and 54 for this purpose.

The use of cream solder for the fixation of the printed circuit boards 48 and 49 to the actuator base 43 is to avoid mechanical stress, which might result from the use of a soldering iron, by making it possible to accomplish soldering by the focusing of light by a halogen lamp. Thus, cream soldering is adopted because the objective lens actuator should be capable of basic motion transmission and the objective lens 56 has to be supported by the two wire springs 51 and 52 with no inclination with respect to the optical axis.

Meanwhile, one end each of stranded wires 81 and 82 is soldered to the second and third soldering positions 72 and 73 of the printed circuit board 54 to feed tracking coil drive signals for exciting the tracking coils 58. In the crossing parts of the wire springs 51 and 52, corresponding to the peak of the triangle, the wire springs are kept from contacting each other.

The lens holder 53 is positioned so that the objective lens 56 come immediately underneath a specific track which is present in a prescribed position from the center of the information disk 35. Rotation in the direction of an arrow 78 effects in tracking control so that the light beam emitted from the objective lens 56 traces on the tracking groove.

Figure 4:
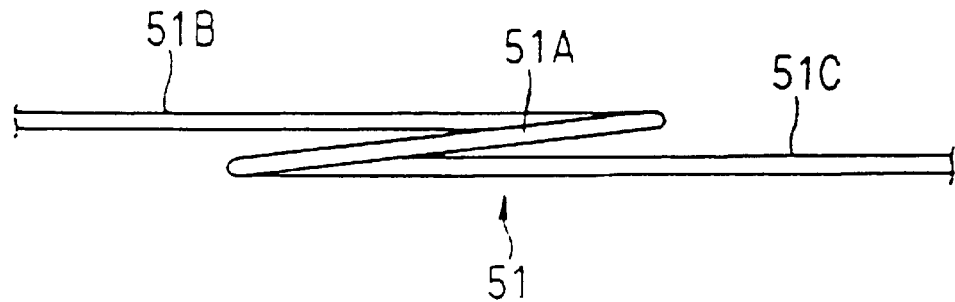
FIG. 4 shows a partial front view of the wire springs as seen from the side of the printed circuit board of the lens holder.

FIG. 4 shows, by way of example, one of the wire springs as viewed from the side of the printed board side of the lens holder. Whereas the wire spring 51 is shown here, the same holds true of the other wire spring 52. By inclining the central portion 51A of the wire spring 51 slightly relative to the horizontal plane and bending non-central portions 51B and 51C in parallel, as viewed from the central portion 51A, so that the difference in height between the two ends of the central portion 51A can be maintained at the crossing thereby to avoid contact between the two portions 51B and 51C. This arrangement to keep the triangularly bent portions of the wire spring 51 from contacting each other at the crossing is to avoid the stress which any contact between them would bring upon the wire spring 51 to deform it and thereby to make difficult smooth rotation of the lens holder, which will be described below.

Figure 5:
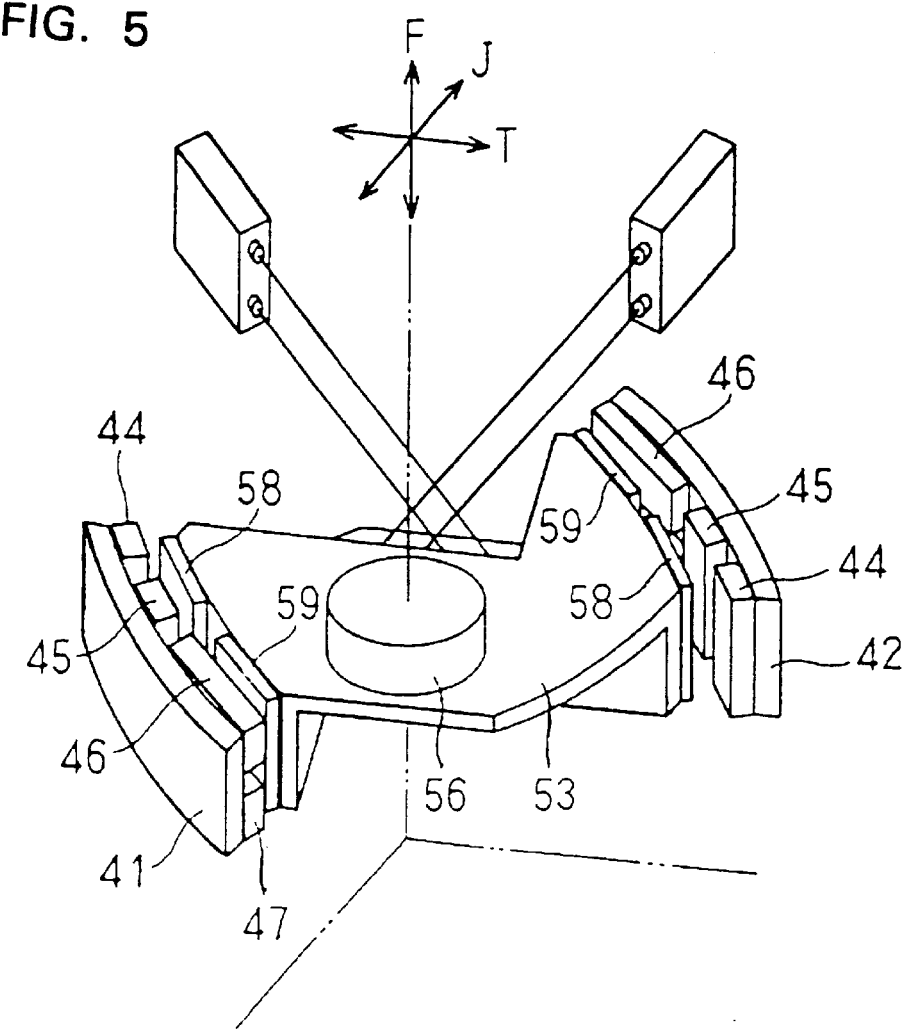
FIG. 5 shows a perspective view of essential parts illustrating the principle of the rotation of the lens holder.

FIG. 5 illustrates the principle of the rotation of the lens holder. The lens holder 53, on whose two side faces the tracking coils 58 and the focusing coils 59 are arranged, is subjected by the magnetic actions of the first through fourth magnets 44 through 47 arranged on the magnet stands 41 and 42, opposite to the coils, to forces in three directions of which one is the focusing direction F, which is the direction of the optical axis of the objective lens 56, another is the direction R of the radius of the disk and the direction J tangent to the disk, orthogonal to the direction T.

Figure 6:
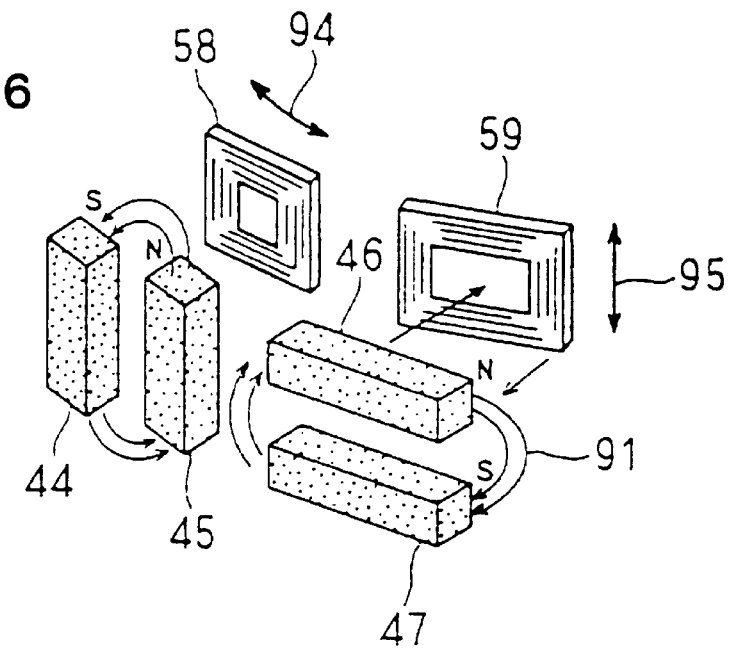
FIG. 6 shows a perspective view of coils and magnets arranged to the left of the lens holder in FIG. 5.

FIG. 6 shows the coils and magnets arranged to the left of the lens holder in FIG. 5. Both the tracking coils 58 and the focusing coils 59 are rectangularly shaped, and each pair of mutually opposite sides of the coils are supplied with magnetic fields of mutually reverse polarities. This configuration of reverse polarities causes the first through fourth magnets 44 through 47 to generate magnetic fluxes 91 constituting plane closed loops, and the opposite sides of these rectangularly shaped coils 58 and 59, with reverse currents flowing in these loops, and Fleming's left-hand rule provides driving forces in the same direction to the opposite sides. The first and second magnets 44 and 45 are arranged in an orthogonal direction to the third and fourth magnets 46 and 47. This is because a force 94 in the direction of the tracking axis, working upon the tracking coils 58, and a force 95 in the direction of the focusing axis, working upon the focusing coils 59, have mutually orthogonal directions.

Figure 7:
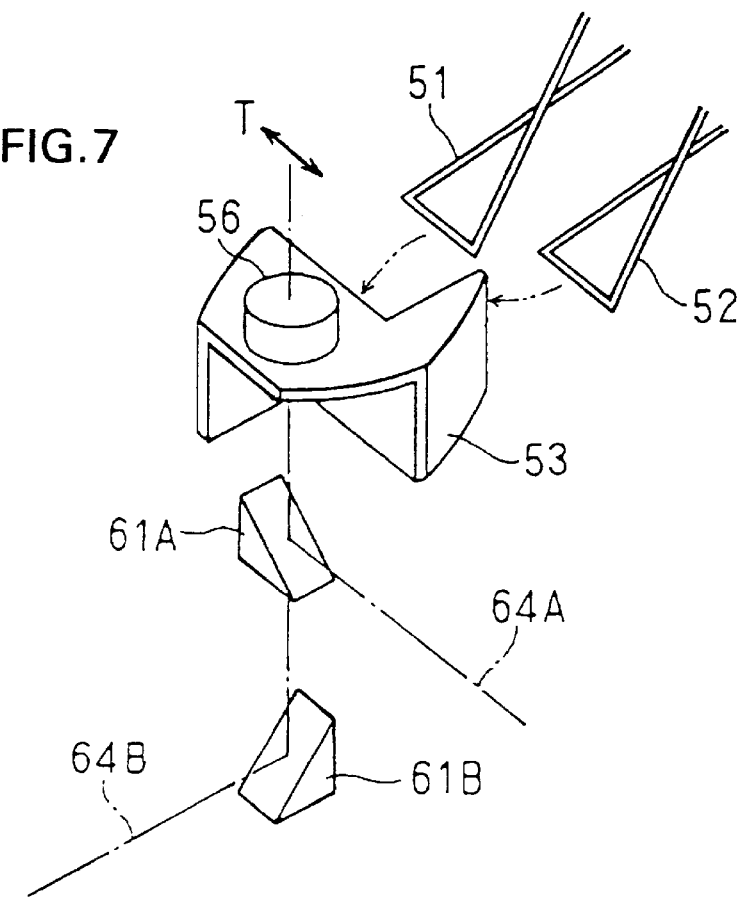
FIG. 7 shows a perspective view of essential parts of the optical system of this optical head apparatus.
Figure 8:
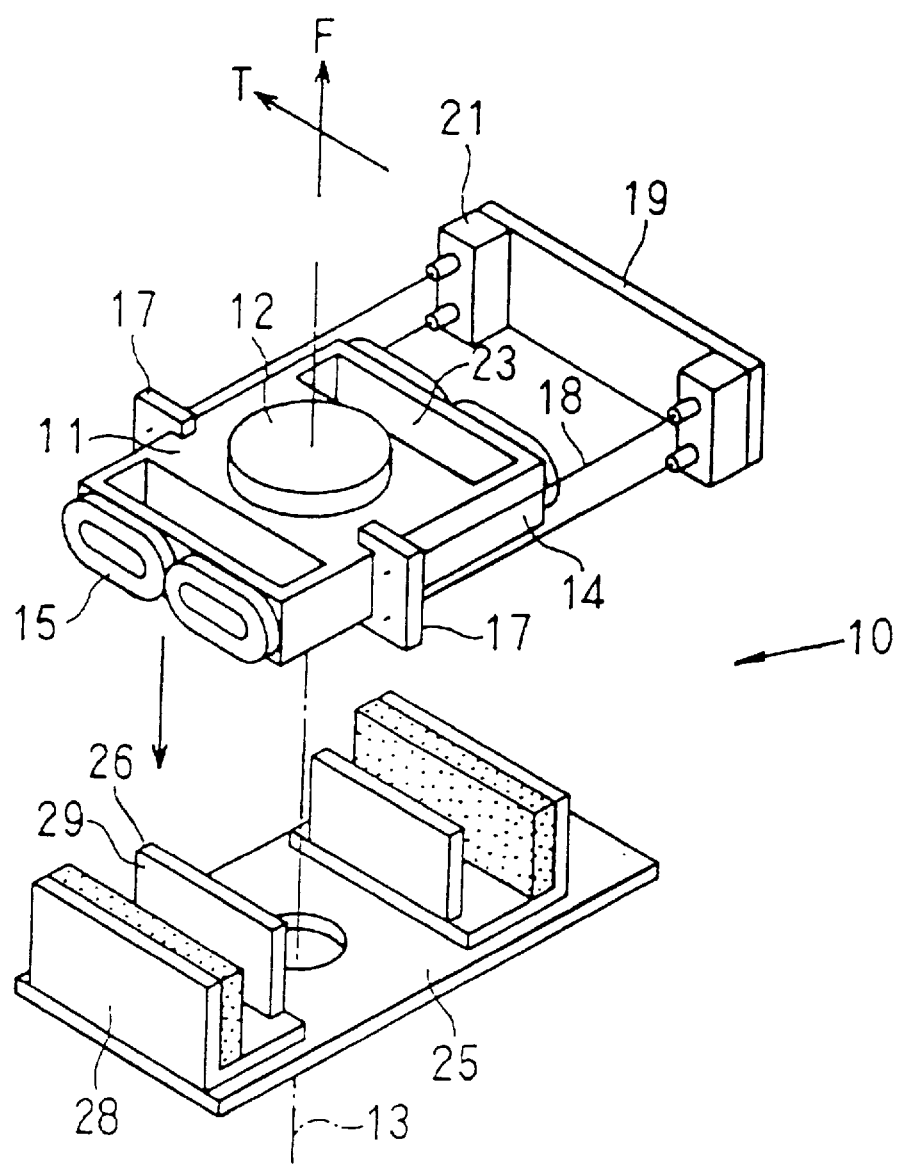
FIG. 8 shows a perspective view of an objective lens actuator according to the prior art.

FIG. 7 illustrates essential parts of the optical system of this optical head apparatus. The part of the lens holder 53 where the objective lens 56 is arranged to set a vacant space for 45-degree mirror 61A or 61B, similar to the mirror 61A but turned by 90 degrees clockwise, can be arranged. The 45-degree mirror 61A, is applicable to a laser beam 64A emitted from a separate type optical system. The separate type optical system in this context means an optical system in which only the objective lens actuator 40 (see FIG. 1) moves along the circumference of the information disk 35 (FIG. 2) but all other elements are fixed. The 45-degree mirror 61B, is applicable to an integrated optical system in which the objective lens actuator 40 and all other elements are integrated. In an integrated optical system, the laser beam 64B comes incident in a direction tangent to the information disk 35. In order to enable the laser beams 64A and 64B to come incident in these two different directions, the actuator base 43 has a shape in which the part immediately below the objective lens 56 is cut out in an L shape.

As hitherto described, this preferred embodiment of the present invention, which is an optical head apparatus, can have a configuration containing a 45-degree mirror 61A or 61B at the height of the lens holder 53 for a collimated laser beam 64A or 64B coming incident in a direction tangent to the information disk 35 or a direction of the radius of this information disk 35, respectively. Therefore, the overall height of the optical head apparatus itself can be reduced.

Although the tracking coils 58 and the focusing coils 59 are stuck not to protrude out of the side walls in this embodiment, obviously they can as well project from part of the side walls, with the projecting parts bent inward. Furthermore, although the plane shape of the lens holder 53 is substantially hexagonal in this embodiment, the overall plane shape may as well be substantially like a barrel, with all other sides than those on which the tracking coils 58 and the focusing coils 59 are to be arranged being rounded. The lens holder may of course have any other suitable plane shape than these.

As described so far, in the optical head apparatus according to the first aspect of the invention, the lens holder wherein the objective lens is arranged on the top plate is supported by a plurality of wire springs, each of which is shaped in a triangle two of whose sides are extended, to be freely movable in the direction of the optical axis of the objective lens and freely rotatable in the horizontal direction, and the deflecting means, such as a mirror or a prism, is arranged, not to be in contact with the lens holder, underneath the part of the the top plate where the objective lens is positioned. Accordingly, there is no need to arrange in two tiers, one over the other, the container of optical systems under the objective lens actuator as according to the prior art, making it possible to reduce the height and size of the apparatus and thereby to save the cost and increase the reliability of the product through the cut-down on the number of components.

According to the second aspect of the invention, two triangularly shaped wire springs, of which the crossing parts are kept from contacting each other and the ends are fixed by cream soldering, so that the wire springs are free from stress when the lens holder rotates or moves up and down, making it possible to accomplish highly precise control. Furthermore, as the two wire springs are also used for transmitting coil drive signals, the number of signal lines directly connected to the lens holder is reduced, resulting in greater stability of the operation.

According to the fifth aspect of the invention, there is provided an opening whose shape is such that a light beam can still come incident even if the deflecting means changes its position by 90 degrees in the horizontal direction, so that the optical head apparatus can be used in common between different types of optical system such as an integrated type and a separate type, resulting in a commensurate cost saving.

According to the sixth and seventh aspects of the invention, the wire springs, each shaped in a triangle with two of its sides extended, permit reliable control of the motions of the objective lens.

While the invention has been described with reference to a specific embodiment thereof, it will be appreciated by those skilled in the art that numerous variations, modifications and embodiments are possible and, accordingly, all such variations, modifications and embodiments are to be regarded as being within the spirit and scope of the invention.

What is claimed is:

1. An optical head apparatus comprising:
   a lens holder having a top plate arranged horizontally, two mutually parallel side walls whose upper ends are positioned at two mutually opposite ends of the top plate, and rectangular tracking coils and rectangular focusing coils disposed on said side walls;
   a plurality of wire springs each comprising a linear member, the linear member having a central part, both ends of the central part being of a prescribed length and being bent to make non-central parts thereof cross each other without contacting each other, with the whole linear member forming a triangle with two of its sides extending, the central parts of the prescribed length being fixed to prescribed positions of the lens holder at different heights so that the central parts are substantially horizontal, and the two ends of each of the central parts being fixed to corresponding positions other than the lens holder so as to enable said lens holder to freely rotate in a horizontal direction and to freely move vertically;
   an objective lens arranged in a position away from the rotational center of said lens holder on said top plate, the vertical direction of the objective lens being coincident with an optical axis;
   magnets fixed in positions opposite to the two side walls of said lens holder with a predetermined gap with respect to the tracking coils and focusing coils on said side walls, said magnets being caused to generate magnetic fields which provide rotational or vertical forces to said lens holder by the excitation of said coils; and
   deflecting means, fixed in the space underneath the position of the objective lens on said top plate not in contact with said lens holder, deflecting a light beam proceeding parallel to the top plate so as to lead the light beam to the objective lens.

2. An optical head apparatus, as claimed in claim 1, wherein said plurality of wire springs comprise two wire springs arranged in two positions, upper and lower, in a substantially central position of said lens holder; the non-central part of said wire springs crossing each other without contacting each other; the ends of said wire springs being cream-soldered to a printed circuit board fixed at positions other than to the lens holder; and said two wire springs transmitting drive signals to excite either of said tracking coils and focusing coils.

3. An optical head apparatus, as claimed in claim 1, wherein the lens holder is hexagonally shaped in a planar view, and the tracking coils and the focusing coils are attached to two side walls corresponding to a specific pair of parallel sides of the hexagonal shape.

4. An optical head apparatus, as claimed in claim 1, wherein said deflecting means is a 45-degree mirror.

5. An optical head apparatus, as claimed in claim 1, wherein an opening whose shape is such that a light beam remains incident when said deflecting means changes its position by 90 degrees in the horizontal direction is arranged underneath said top plate of said lens holder.

6. An optical head apparatus, as claimed in claim 1, wherein said wire springs comprise a phosphor bronze spring material.

7. An optical head apparatus, as claimed in claim 1, wherein said wire springs comprise a stainless steel spring material, and the soldered parts are plated with a material which has a good solderability, such as copper, silver or gold.

8. An optical head apparatus comprising:
   a lens holder having a hexagonal shape as a whole in a planar view, a top plate arranged horizontally, two mutually parallel side walls having upper ends positioned at two mutually opposite ends of the top plate and being arranged in positions approximately symmetrical with respect to a center of said hexagonal shape, a center wall extending from said top plate in a direction of the said side walls and passing at the center of said hexagonal shape, and tracking coils and focusing coils disposed on the side walls;

a plurality of wire springs each comprising a linear member, the linear member having a central part having two ends, both ends of the central part being of a prescribed length and being bent to form non-central parts crossing each other without contacting each other, with the whole linear member forming a triangle with two of sides of the triangle extended, said central parts of said wire springs being fixed to said center wall of the lens holder at different heights so that the central parts are substantially horizontal, and the two ends of each of the central parts being fixed to corresponding positions other than the lens holder so as to enable said lens holder to freely rotate in a horizontal direction and to freely move vertically;

an objective lens arranged on said top plate at a position close to said center wall of said lens holder, the vertical direction of the objective lens being coincident with an optical axis;

magnets fixed in positions opposite to the two side walls of said lens holder with a predetermined gap with respect to the tracking coils and focusing coils on the side walls, the magnets being caused to generate magnetic fields which provide rotational or vertical forces to said lens holder by the excitation of said coils; and deflecting means, fixed in the space underneath the position of the objective lens not in contact wit said lens holder, deflecting a light beam in parallel to the top plate so as to lead the light beam to the objective lens.

9. An optical head apparatus, as claimed in claim 8, wherein said plurality of wire springs comprise two wire springs arranged in two positions, upper and lower, in a substantially central position of said lens holder; the non-central parts of said wire springs crossing each other without contact with each other; the ends of the wire springs being cream-soldered to a printed circuit board fixed at positions other than to the lens holder; and the two wire springs transmitting drive signals to excite either of said tracking coils and focusing coils.

10. An optical head apparatus, as claimed in claim 8, wherein the lens holder is hexagonally shaped in a planar view, and the tracking coils and the focusing coils are attached to two side walls corresponding to a specific pair of parallel sides of the hexagonal shape.

11. An optical head apparatus, as claimed in claim 8, wherein said deflecting means comprises a 45 degree mirror.

12. An optical head apparatus, as claimed in claim 8, wherein an opening whose shape is such that a light beam remains incident when said deflecting means changes its position by 90 degrees in the horizontal direction is arranged underneath said top plate of said lens holder.

13. An optical head apparatus, as claimed in claim 8, wherein said wire springs comprise a phosphor bronze spring material.

14. An optical head apparatus, as claimed in claim 8, wherein said wire springs comprise a stainless steel spring material, and the soldered parts are plated with a material which has a good solderability, such as copper, silver or gold.

* * * * *